United States Patent
Kazuyoshi et al.

(10) Patent No.: US 7,667,809 B2
(45) Date of Patent: Feb. 23, 2010

(54) FFS MODE LIQUID CRYSTAL DISPLAY DEVICE AND METHOD OF FABRICATING THE SAME

(75) Inventors: Nagayama Kazuyoshi, Yokohama (JP); Mornoi Yuichi, Yokohama (JP)

(73) Assignee: LG. Display Co., Ltd., Seoul (KR)

( * ) Notice: Subject to any disclaimer, the term of this patent is extended or adjusted under 35 U.S.C. 154(b) by 320 days.

(21) Appl. No.: 11/647,535

(22) Filed: Dec. 28, 2006

(65) Prior Publication Data

US 2007/0165174 A1    Jul. 19, 2007

(30) Foreign Application Priority Data

Dec. 28, 2005 (JP) .......................... P 2005-377202
Dec. 28, 2005 (JP) .......................... P 2005-379770

(51) Int. Cl.
*G02F 1/1343* (2006.01)

(52) U.S. Cl. .................. 349/144; 349/141; 349/142

(58) Field of Classification Search ................. 349/141, 349/142, 144, 129
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,320,637 B1 * | 11/2001 | Kim et al. | 349/141 |
| 6,441,878 B1 * | 8/2002 | Wong | 349/143 |
| 6,445,434 B2 * | 9/2002 | Takato et al. | 349/123 |
| 2004/0189925 A1 * | 9/2004 | Ohmuro et al. | 349/144 |
| 2005/0140897 A1 * | 6/2005 | Kim | 349/141 |
| 2007/0200989 A1 * | 8/2007 | Shinichi et al. | 349/129 |

FOREIGN PATENT DOCUMENTS

| | | |
|---|---|---|
| CN | 1661421 A | 8/2005 |
| JP | 5-72529 | 3/1993 |

OTHER PUBLICATIONS

First Office Action issued in corresponding Chinese Patent Application No. 200610168252.0; issued Mar. 7, 2008.

* cited by examiner

*Primary Examiner*—David Nelms
*Assistant Examiner*—Hoan C Nguyen
(74) *Attorney, Agent, or Firm*—Brinks Hofer Gilson & Lione

(57) ABSTRACT

A liquid crystal display device and method of fabricating the device where the device can control a viewing angle in all directions without forming a white pixel. The liquid crystal display device includes a display control region that is controlled such that liquid crystal molecules are inclined and a viewing-angle control region that is controlled such that liquid crystal molecules are aligned in a horizontal or vertical direction, where a control voltage is supplied through a viewing angle control line independent of a common line for the display control region.

4 Claims, 16 Drawing Sheets

▨ Common electrode

▦ Pixel electrode

▨ Common electrode

▦ Pixel electrode

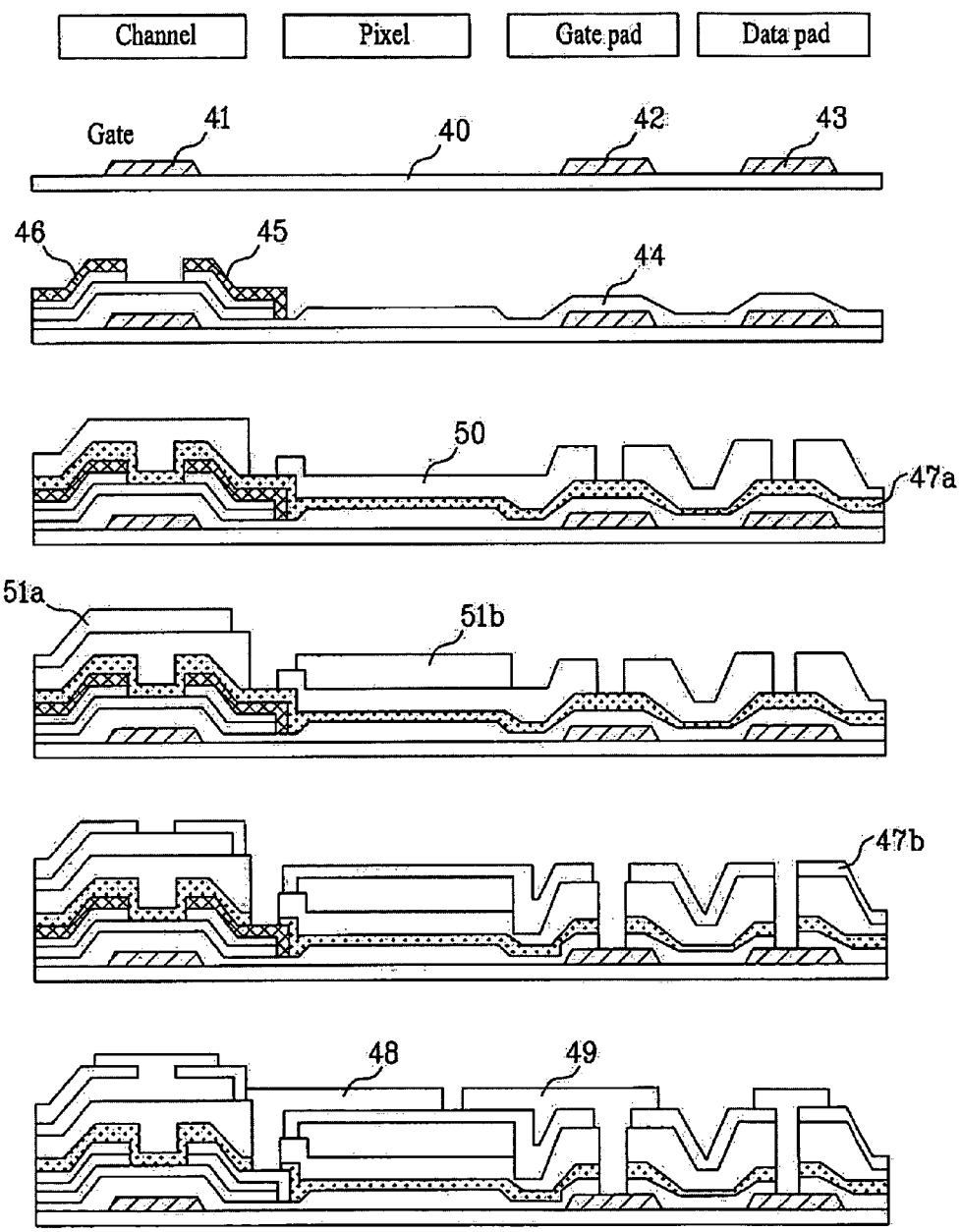

////// Common electrode

::::::: Pixel electrode

////// Common electrode

::::::: Pixel electrode

When no voltage is applied

When voltage is applied

US 7,667,809 B2

FFS MODE LIQUID CRYSTAL DISPLAY DEVICE AND METHOD OF FABRICATING THE SAME

This application claims the benefit of the Japanese Patent Application Nos. JP2005-379770 and JP2005-377202, filed on Dec. 28, 2005, which is hereby incorporated by reference as if fully set forth herein.

BACKGROUND

1. Technical Field

The present invention relates to a liquid crystal display (LCD) device which can control a viewing angle, and a method of manufacturing the same, and more particularly, to a fringe field switching (FFS) mode LCD device.

2. Discussion of the Related Art

Liquid crystal displays, especially, liquid crystal displays adopting thin film transistors (TFT) have been widely used in various applications from mobile phones to large-sized televisions.

One of them is a personal display device, the display screen of which is required to be seen by a user of the personal display device but not to be seen by other persons who view the personal display device from the side.

Preferably, the personal display device is constructed such that the display screen of the personal display device can be viewed by a large number of persons or the display screen can be exclusively used by only one individual as occasion demands.

FIG. 11 is a schematic drawing illustrating a related art LCD device having a secret mode.

There has been proposed a display having the secret mode shown in FIG. 6 (for example, Japanese Unexamined Publication No. 5-72529).

Referring to FIG. 11, when using a backlight which emits light to the rear surface of a liquid crystal display panel, it necessarily requires the backlight having the high directivity.

Between the common liquid crystal display panel and the backlight having the high directivity, there is another liquid crystal display panel for switching between a scattered state and an unscattered state, for example, a polymer dispersed type liquid crystal display panel (a scattering-unscattering switching layer).

When the scattering-unscattering switching layer is in an unscattered state, the light emitted from the backlight proceeds only to the front direction. Thus, if the person is positioned at the side of the liquid crystal display panel, it is impossible for the person positioned at the side to view the displayed image.

On the other hand, if the scattering-unscattering switching layer is in a scattered state, the light emitted from the backlight proceeds to the side directions as well as the front direction. Thus, even though the person is positioned at the side of the liquid crystal display panel, it is possible to view the displayed image. Consequently, a large number of persons can view the image displayed on the liquid crystal display panel.

In this case, it is necessary to fabricate a special liquid crystal display panel which is different from the common liquid crystal display panel. Therefore, the manufacturing costs are increased.

In order to solve this problem, there has been proposed a method using a vertical alignment type liquid crystal display device. Hereinafter, the vertical alignment type liquid crystal display device is explained with reference to FIGS. 12 to 15.

Hereinafter, the fundamental principle thereof will be described in detail with reference to FIGS. 12 to 15.

FIGS. 12A and 12B are schematic drawings illustrating the shape of liquid crystal molecule when viewing the vertical alignment type liquid crystal display device from the front side.

In a state that the voltage is not applied to the liquid crystal display panel as shown in FIG. 12A, the liquid crystal molecule is aligned vertically. When the voltage is applied to the liquid crystal display panel as shown in FIG. 12B, the liquid crystal molecule is inclined upward. In this case, a polarizer has its axis directed in the vertical direction, and an analyzer has its axis directed in the horizontal direction.

FIG. 12A illustrates a case that the vertically aligned liquid crystal display panel, to which the voltage is not applied, is viewed from the front. According as the birefringence of the liquid crystal molecule does not occur, any light is not transmitted.

On the other hand, FIG. 12B illustrates a case that the vertically aligned liquid crystal display panel, to which the voltage is applied, is viewed from the front. The optical axis of the liquid crystal molecule is in parallel with the absorption axis of the polarizer. Also, birefringence of the liquid crystal molecule does not occur, and any light is not transmitted.

FIGS. 13A and 13B are schematic drawings illustrating the shape of a liquid crystal molecule when viewing the vertical alignment type liquid crystal display device from the side at an angle to the front of the liquid crystal display device.

When the voltage is not applied, as shown in FIG. 13A, the axis of the liquid crystal molecule is in parallel with the absorption axis of the analyzer, and therefore, the light is not transmitted.

On the other hand, when the voltage is applied, as shown in FIG. 13B, the axis of the liquid crystal molecule is offset from the axis of the polarizer or the axis of the analyzer. Consequently, birefringence of the liquid crystal molecule occurs, and light is transmitted.

When the light leakage phenomenon is used, the display contrast is lowered to the extreme in the horizontal (left and right) direction. As a result, it is impossible to recognize what is written even when the display is seen from a horizontal direction. Consequently, it is possible to control the confidentiality of the display using this light leakage phenomenon.

FIG. 14 is a schematic drawing illustrating the specific construction for controlling the confidentiality of the display. In FIG. 14, a single pixel includes sub-pixels of red, green and blue (RGB) and a sub-pixel of white (W).

FIG. 15 is a plan view illustrating the arrangement of liquid crystal molecules of the respective sub-pixels shown in FIG. 14. As shown in FIG. 15, the alignment of the liquid crystal molecules in the white sub-pixel is quite different from the alignment of the liquid crystal molecules in the RGB sub-pixels.

Consequently, when the voltage is not applied to the white sub-pixel, the white sub-pixel does not contribute to the display, whereby a normal display can be realized.

When the voltage is applied to the white sub-pixel, the white display is performed at the front in the horizontal (left and right) direction. As a result, the contrast of the display is lowered in the horizontal (left and right) viewing angle direction, and therefore, it is difficult for other people to view the displayed image.

Hereinafter, a fringe field switching (FFS) mode LCD device, which includes a common electrode in shape of "<" to improve a viewing angle, will be explained as follows.

FIG. 16 is a plan view illustrating each of RGB pixels for a related art FFS mode LCD device. FIGS. 17A and 17B are schematic drawings illustrating the operation of liquid crystal molecules according as the voltage is applied to a related art FFS mode LCD device or not.

As shown in FIG. 16, the related art FFS mode LCD device includes a common electrode which is formed in shape of "<", so as to regulate the inclination direction of liquid crystal.

As shown in FIG. 17A, if the voltage is not applied to the LCD device, the liquid crystal molecules are aligned in the vertical direction. If the voltage is applied to the LCD device, the liquid crystal molecules are inclined in the predetermined direction decided based on the effect of the inclined electric field by the common electrode, that is, the direction perpendicular to the extending direction of the common electrode, as shown in FIG. 17B. As a result, the liquid crystal molecules are inclined to the two directions corresponding to a chevron "<" shape, whereby the LCD device has the good viewing angle.

However, the related art LCD device has the following problems.

First, the related art LCD device is constructed such that the white sub-pixel is formed; however, it is necessary to newly form a white resin, and the driving operation of the white sub-pixel is different from the related art.

Even though the visibility for the specific direction in the LCD device can be improved owing to the "<"— shaped common electrode, it is impossible to obtain the display of confidentiality on occasion demands.

SUMMARY

Accordingly, the present invention is directed to an FFS mode LCD device, which substantially obviates one or more problems due to limitations and disadvantages of the related art.

In accordance with the invention, as embodied and broadly described herein, a liquid crystal display device includes a display control region that is controlled such that liquid crystal molecules are inclined and a viewing-angle control region that is controlled such that liquid crystal molecules are aligned in a horizontal or vertical direction, where a control voltage is supplied through a viewing angle control line formed independent of a common line for the display control region.

In another aspect of the present invention, a method for fabricating of a liquid crystal display device includes forming a gate electrode, a gate pad and a data pad on a substrate and forming a gate insulation layer and source and drain electrodes on the gate electrode. A first passivation layer and a photoacrylic layer are formed on an entire surface of the substrate and a contact hole is formed therein. A common electrode is formed for a display control region where liquid crystal molecules are inclined, and a common electrode is formed for a viewing-angle control region where liquid crystal molecules are inclined in horizontal and vertical directions. A second passivation layer is formed on the entire surface of the substrate, and a contact hole if formed therein. A pixel electrode is formed in the display control region, and a viewing-angle control electrode is formed in the viewing-angle control region corresponding to each display control region, to incline the liquid crystal molecules in vertical and horizontal directions.

In yet another aspect, a method for fabricating of a liquid crystal display device including liquid crystal molecules includes forming a display control region that is controlled such that liquid crystal molecules are inclined and forming a viewing-angle control region that is controlled such that liquid crystal molecules are aligned in a horizontal or vertical direction, wherein a control voltage is supplied through a viewing angle control line formed independently of a common line for the display control region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates cross-sectional views of process steps in a method of manufacturing an LCD device according to the first embodiment of the present invention;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
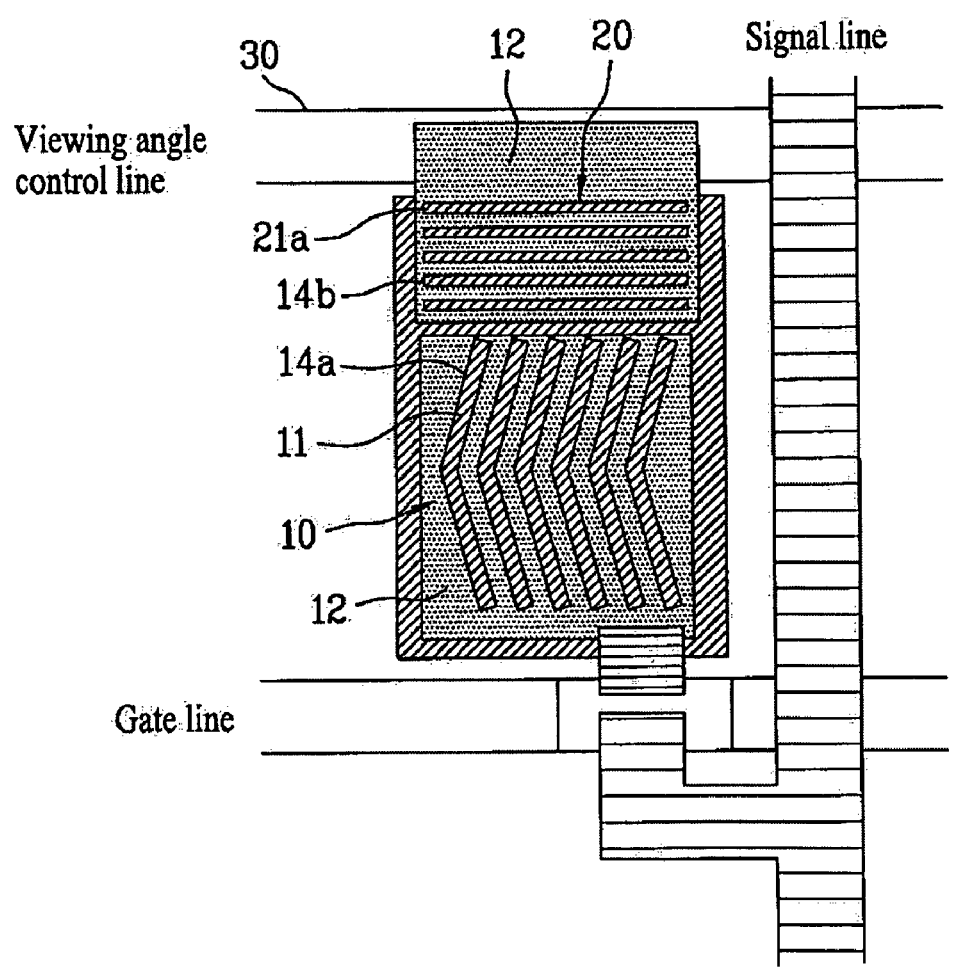
FIG. 1 is a plan view illustrating a pixel in an FFS mode LCD device according to a first embodiment of the present invention.

FIG. 1 is a plan view illustrating a pixel in an FFS mode LCD device according to the first embodiment of the present invention. In FIG. 1, one pixel includes a display control region 10 and a viewing-angle control region 20.

The display control region 10 controls the inclination direction of liquid crystal molecules by a common electrode 11 exposed in shape of a chevron "<", to thereby regulate the inclination direction of liquid crystal.

Each of RGB pixels includes the display control region 10 which is provided with the common electrode 11 exposed in shape of a chevron "<", and a pixel electrode 12. That is, the pixel electrode 12 of the display control region 10 is provided with a first pixel hole 14a formed in shape of a chevron "<". Also, the common electrode 11 is formed in a plate shape which is overlapped with the pixel electrode 12 of the display control region 10 and the pixel electrode 12 of the viewing-angle control region 20.

As applying a voltage to the desired pixel, the liquid crystal molecules are inclined to the two directions corresponding to the chevron "<" shaped first pixel hole 14a, thereby displaying the color image with the good viewing angle The viewing-angle control region 20 is a region in which the alignment of the liquid crystal molecules is controlled such that the liquid crystal molecules are inclined in the horizontal (left and right) or vertical (up and down) direction. At this time, a control voltage is applied to the viewing-angle control region 20 through a viewing-angle control line 30 which is separated from the display control region 10.

The viewing-angle control region 20 includes at least one of a common electrode 21a in the horizontal (left and right) direction by a second pixel hole 14a of a line shape as shown in FIG. 1, and a common electrode 21b (shown in FIG. 6B) in the vertical direction. In detail, the pixel electrode 12 of the viewing-angle control region 20 is formed independently of the pixel electrode of the display control region. Also, the pixel electrode 12 of the viewing-angle control region 20 has the second pixel hole 14b formed in the line shape. The common electrode 11 is exposed in the square shape by the line-shaped second pixel hole 14b.

As shown in FIG. 1, a voltage is supplied to the viewing-angle control region 20 through an additional viewing-angle control line 30 which is formed separately from the display control region 10. The viewing-angle control line 30 is an independent common line for the viewing-angle control region 20, wherein the viewing-angle control line 30 is formed of a transparent electrode, to thereby improve an aperture ratio. Also, the common line is formed separately, so that it is possible to apply a voltage having a predetermined wavelength to the viewing-angle control region 20.

As the voltage is applied or not, the operation of the liquid crystal molecules in the viewing-angle control region 20 will be explained in detail.

Figure 2A:
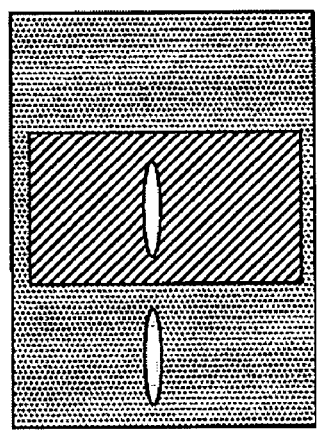
FIGS. 2A and 2B are schematic drawings illustrating the operation of liquid crystal molecules in a viewing-angle control region having a common electrode by a vertical direction in an FFS mode LCD device according to the first embodiment of the present invention.
Figure 2B:
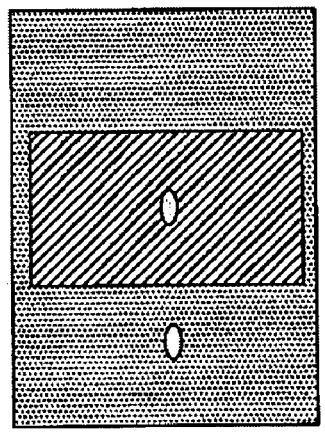

FIGS. 2A and 2B are schematic drawings illustrating the operation of liquid crystal molecules in the viewing-angle control region having the common electrode 21a by the vertical (up and down) direction in the FFS mode LCD device according to the first embodiment of the present invention.

When voltage is not applied to the viewing-angle control region 20 having the common electrode 21a of the horizontal (left and right) direction, as shown in FIG. 2A, the liquid crystal molecules are in the horizontal state. Accordingly, the viewing-angle control region 20 becomes black, whereby the whole display is not affected. This is identical in the front viewing angle, the vertical (up and down) and horizontal (left and right) viewing angles, and the inclined viewing angle. All of the display obtaining the RGB pixels is normally used.

If the voltage is applied to the viewing-angle control region 20 having the common electrode 21a of the horizontal (left and right) direction, as shown in FIG. 2B, the liquid crystal molecules are aligned vertically in the center of the common electrode, and in the center of the portion between each common electrode.

When the viewing-angle control region 20 is viewed in the horizontal (left and right) direction, the bright light is transmitted through the common electrode 21a of the horizontal (left and right) direction. On the other hand, when the viewing-angle control region 20 is viewed in the vertical (up and down) direction, the light is not transmitted through the common electrode 21a of the horizontal (left and right) direction.

Meanwhile, when the voltage is applied to the viewing-angle control region 20 having the common electrode 21b (shown in FIG. 6B) of the vertical (up and down) direction, the liquid crystal molecules rise vertically in a direction different by 90 degrees from the direction shown in FIG. 2B, in the central portion of the common electrode 21a, and in the central portion between each of the common electrode 21a.

Consequently, when the viewing-angle control region 20 is viewed only in the horizontal (left and right) direction, the light is transmitted through the common electrode 21b (shown in FIG. 6B) of the vertical (up and down) direction. When the viewing-angle control region 20 is viewed in the vertical (up and down) direction, the bright light is transmitted through the common electrode 21b (shown in FIG. 6B) of the vertical (up and down) direction.

As a result, on the viewing angle from the horizontal (left and right) direction in state of that the voltage is applied to the viewing-angle control region 20, the viewing-angle control region having the common electrode 21a of the horizontal (left and right) direction is recognized as white, and the viewing-angle control region having the common electrode 21b (shown in FIG. 6B) of the vertical (up and down) direction is recognized as black.

On the viewing angle from the vertical (up and down) direction, the viewing-angle control region having the common electrode 21a of the horizontal (left and right) direction is recognized as black, and the viewing-angle control region having the common electrode 21b (shown in FIG. 6B) of the vertical (up and down) direction is recognized as white.

Also, these patterns are overlapped with the common display pattern of the RGB pixels. Consequently, when the patterns are viewed in the horizontal (left and right) direction and the vertical (up and down) direction, it is impossible to recognize what is written.

As described above, the viewing-angle control region 20 corresponding to each display control region 10 includes at least one of the common electrode 21a of the horizontal (left and right) direction and the common electrode 21b (shown in FIG. 6B) of the vertical (up and down) direction. Thus, it is possible to brighten the display in the horizontal (left and right) or vertical (up and down) viewing angle direction by applying the voltage to the viewing-angle control region 20, thereby accomplishing the display of the desired confidentiality at the both directions from the horizontal (left and right) and vertical (up and down) directions except the front direction.

A method of forming the viewing-angle control region 20 will be explained as follows.

FIG. 3 illustrates cross-sectional views of process steps in a method of manufacturing an LCD device according to the first embodiment of the present invention.

First, according to a first process, a gate electrode 41, a gate pad 42, and a data pad 43 are formed on a substrate 40.

Subsequently, according to a second process, a gate insulation layer 44 is formed, and an a-Si layer and an n+ a-Si layer are formed. Thereafter, a metal layer is formed on the n+ a-Si layer, and holes are formed by etching. Then, source and drain electrodes 45 and 46 are formed on the gate electrode 41.

According to a third process, a first passivation layer 47a and a photo-acryl layer 50 (or insulation layer) are formed on an entire surface of the substrate 40, and then contact holes are formed therein.

According to a fourth process, separate common electrodes 51a and 51b are formed on a channel and a display control region 10. At this time, the common electrode 51b formed on the display control region 10 corresponds to the common electrode 11 of FIG. 1.

According to a fifth process, a second passivation layer 47b is formed on the entire surface of the substrate 40, and then contact holes are formed therein.

According to a sixth process, a pixel electrode 48 is formed in the display control region 10 in which the alignment of liquid crystal molecules is controlled such that the liquid crystal molecules are inclined, and the liquid crystal molecules are inclined to the vertical (up and down) and horizontal (left and right) directions. Also, a viewing-angle control electrode 49 is formed in a viewing-angle control region 20 to which a control voltage is applied through a viewing-angle control line 30 formed independently. At this time, the pixel electrode 48 formed in the display control region corresponds to the pixel electrode 12 of FIG. 1.

Figure 4:
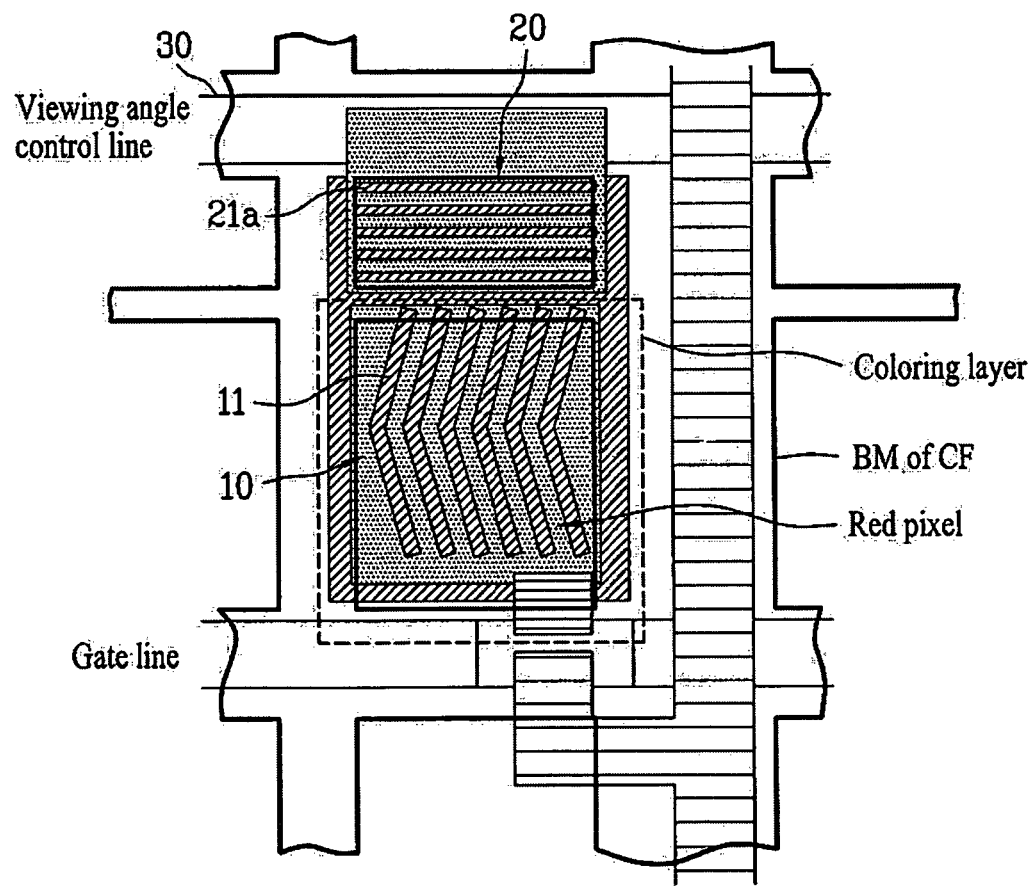
FIG. 4 is a plan view illustrating a pixel in an LCD device in accordance with the first embodiment manufactured by FIG. 3.

FIG. 4 is a plan view illustrating a pixel in an LCD device of the first embodiment manufactured by FIG. 3, which shows one example of R pixel.

By completing the process, the structure shown in FIG. 4 is formed.

As shown in FIG. 4, the viewing-angle control region 20 can realize the confidentiality of display in the vertical (up and down) or horizontal (left and right) direction, so that it is unnecessary to form a coloring layer by a color filter.

By the above-mentioned 6-mask process, the independent viewing-angle control line 30 may be formed of the transparent electrode. Also, it is also possible to fill the viewing-angle control region 20 having the corresponding common electrode in the vertical (up and down) or horizontal (left and right) direction by applying the mask of the sixth process.

Figure 5:
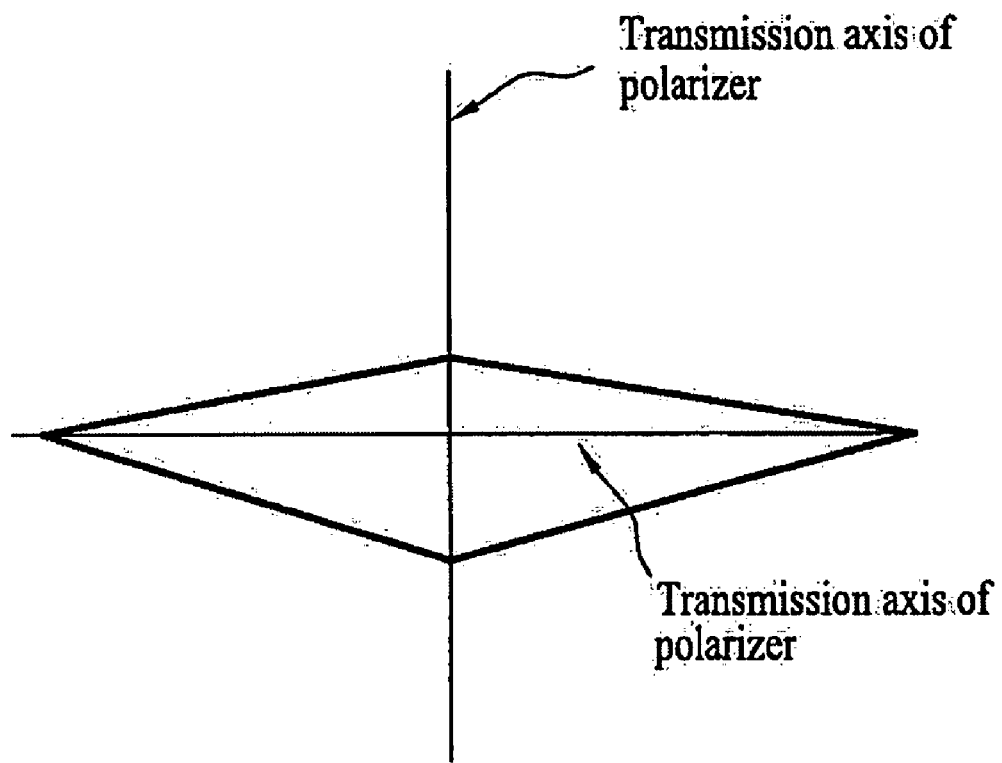
FIG. 5 is a schematic drawing illustrating a luminance distribution of viewing-angle dependency as a voltage is applied to a viewing-angle control region according to the first embodiment of the present invention.

FIG. 5 is a schematic drawing illustrating the luminance distribution of viewing-angle dependency based on the application of voltage in the viewing-angle control region 20 according to the preferred embodiment of the present invention. FIG. 5 illustrates the luminance distribution when the common electrode 21a of the horizontal (left and right) direction is formed in the viewing-angle control region 20.

If the voltage is not applied to the viewing-angle control region 20, the luminance of the inclined direction corresponds to the black screen in the front and side directions from the vertical (up and down) and horizontal (left and right) directions. If the voltage is applied to the viewing-angle control region 20, the front is in the black, and the light is transmitted to the side directions from the vertical (up and down) and horizontal (left and right) directions. As a result, the light is transmitted to the side directions. Thus, the person is positioned at the side direction of the device, it is difficult to recognize the image displayed on the panel, thereby obtaining the confidentiality of displayed information.

If forming the common electrode 21b (shown in FIG. 6B) of the vertical direction in the viewing-angle control region 20, the light is transmitted in the inclined direction by the vertical (up and down) direction. When viewing the display screen from the side portions in the vertical (up and down) direction, it is impossible to recognize what is written, thereby obtaining the confidentiality of displayed information.

Figure 6A:
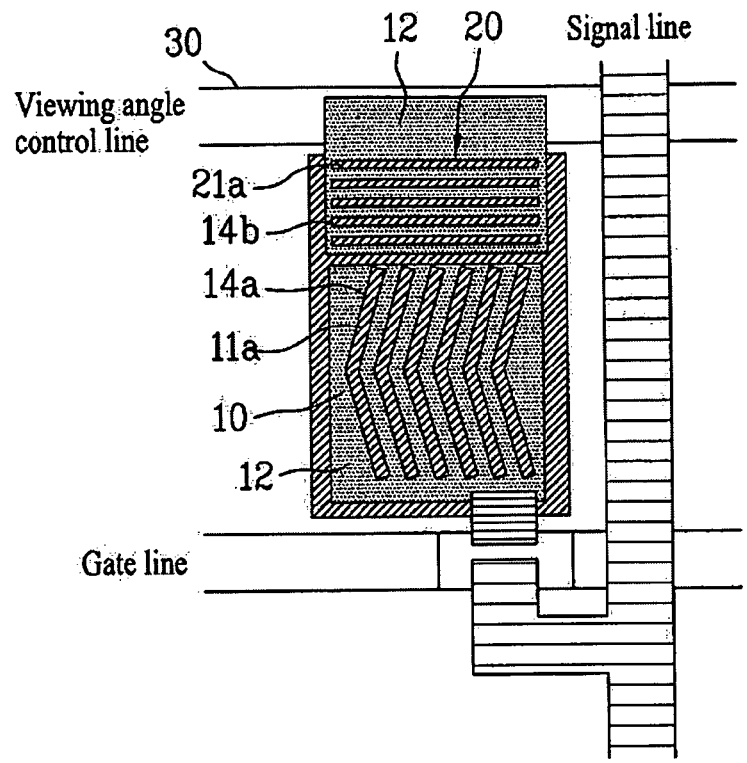
FIGS. 6A and 6B are plan views illustrating a pixel of an FFS mode LCD device according the first embodiment of the present invention.
Figure 6B:
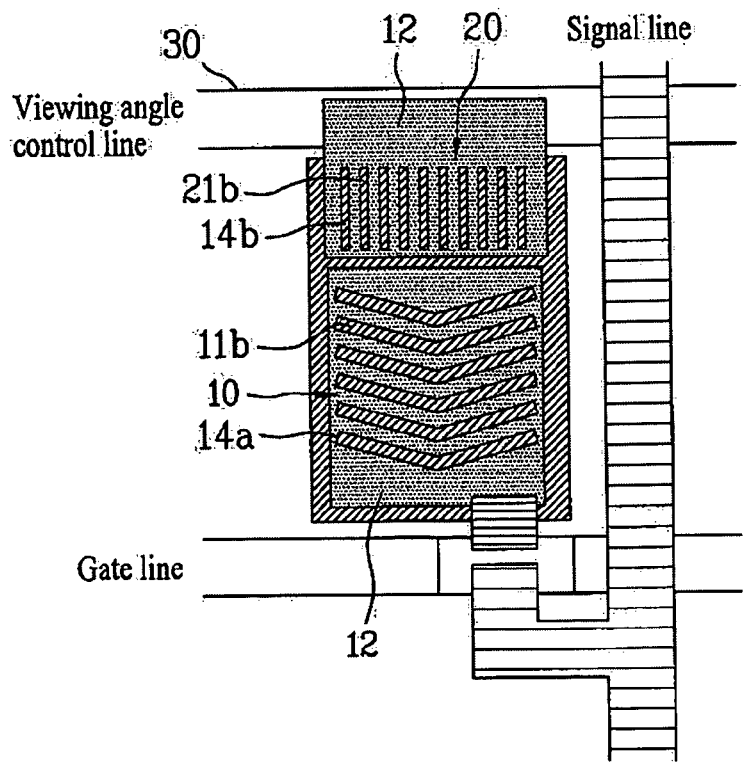

FIGS. 6A and 6B are plan views illustrating a pixel of an FFS mode LCD device according the first embodiment of the present invention. FIG. 6A illustrates the viewing-angle control region 20 having the common electrode 21a formed in the horizontal direction. FIG. 6B illustrates the viewing-angle control region 20 having the common electrode 21b formed in the vertical direction.

As shown in FIG. 6A, the display control region 10 includes the plurality of common electrodes 11a arranged at predetermined intervals along the horizontal direction, wherein the common electrode 11a is exposed by the first pixel hole 14a having the shape of a chevron "<", to thereby improve the visibility in the horizontal (left and right) direction. In addition, the viewing-angle control region 20 includes the plurality of common electrodes 21a arranged at predetermined intervals along the vertical (up and down) direction, wherein the common electrode 21a is exposed by the second pixel hole 14b, thereby obtaining the confidentiality of information in the horizontal (left and right) direction on demands.

As shown in FIG. 6B, the display control region 10 includes the plurality of common electrodes 11b arranged at predetermined intervals along the vertical direction, wherein the common electrode 11b is exposed by the pixel hole having the shape of a chevron "<", to thereby improve the visibility in the vertical (up and down) direction. In addition, the viewing-angle control region 20 includes the plurality of common electrodes 21b arranged at predetermined intervals along the horizontal (left and right) direction, wherein the common electrode 21b is exposed by the second pixel hole 14b, thereby obtaining the confidentiality of information in the vertical (up and down) direction on demands.

According as one display screen is provided with both the pixel structure of FIG. 6A and the pixel structure of FIG. 6B, it is possible to improve the visibility in the vertical (up and down) and horizontal (left and right) directions, and to obtain the confidentiality of information in the vertical (up and down) and horizontal (left and right) directions.

Figure 7:
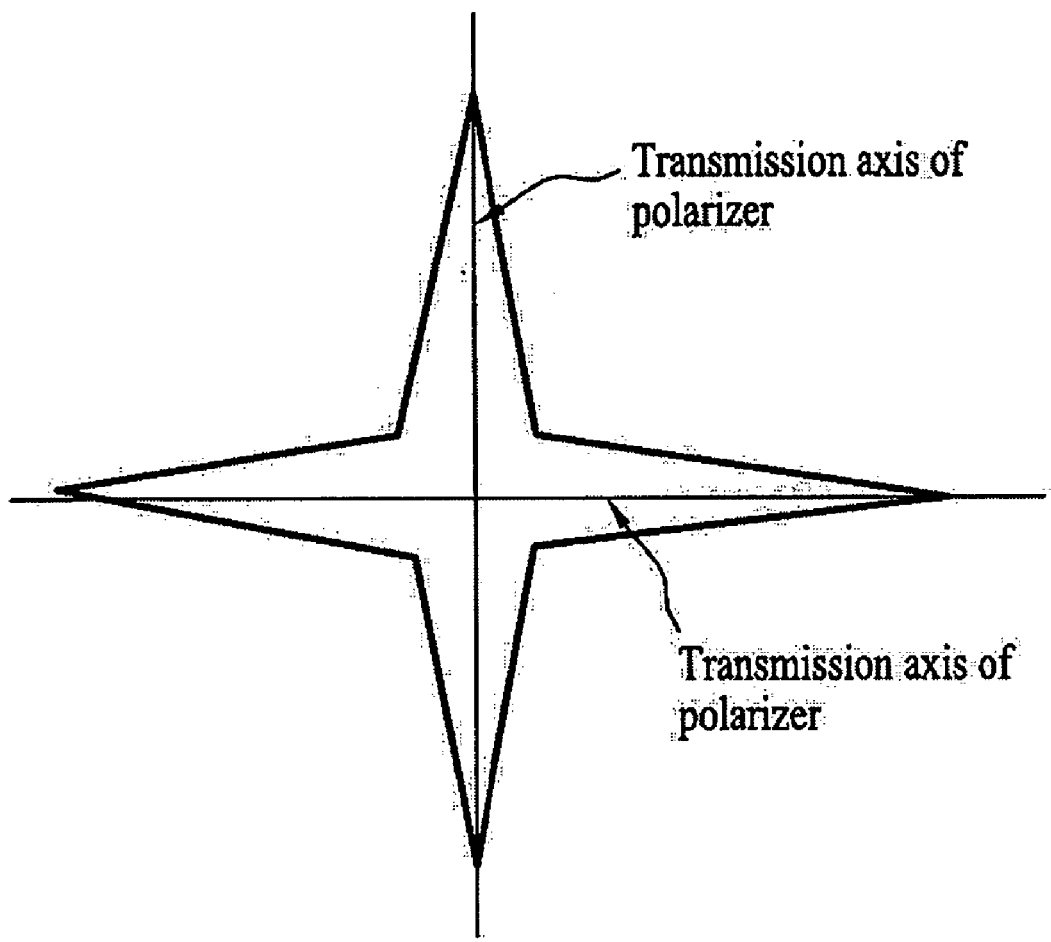
FIG. 7 is a schematic drawing illustrating a luminance distribution of viewing-angle dependency as a voltage is applied to a viewing-angle control region according to the first embodiment of the present invention.

FIG. 7 is schematic drawing illustrating the luminance distribution of viewing-angle dependency based on the application of voltage in the viewing-angle control region 20 according to the preferred embodiment of the present invention. That is, FIG. 7 illustrates the luminance distribution when the display screen is provided both the pixel structure of FIG. 6A and the pixel structure of FIG. 6B.

If the voltage is not applied to the viewing-angle control region 20, the luminance corresponds to the black screen from the front and side portions in the vertical (up and down) and horizontal (left and right) directions. Accordingly, the viewing-angle control region 20 can improve the visibility in the horizontal (left and right) and vertical (up and down) direction by the operation of the common electrodes 11a and 11b of the display control region without any effects on the display information.

If the voltage is applied to the viewing-angle control region 20, the front is in the black state, and the light is transmitted to the side directions in the vertical (up and down) and horizontal (left and right) directions by the operation of the common electrodes 21a and 21b of the viewing-angle control region. Thus, the person is positioned at the side direction of the device, it is difficult to recognize the image displayed on the panel, thereby obtaining the confidentiality of displayed information in the vertical (up and down) and horizontal (left and right) directions.

For the FFS mode LCD device according to the present invention, when improving the visibility by using the chevron "<" shaped common electrode exposed by the chevron "<" shaped pixel hole, it is possible to realize the control for the viewing angle in the vertical (up and down) or horizontal (left and right) direction by forming the viewing-angle control region.

Further, the transparent electrode is used of the viewing-angle control line without the effect of signal delay caused by the thickness of the acrylic layer in the viewing-angle control region, thereby improving the aperture ratio. Also, it is possible to realize the LCD device having the confidentiality of displayed information.

Figure 8:
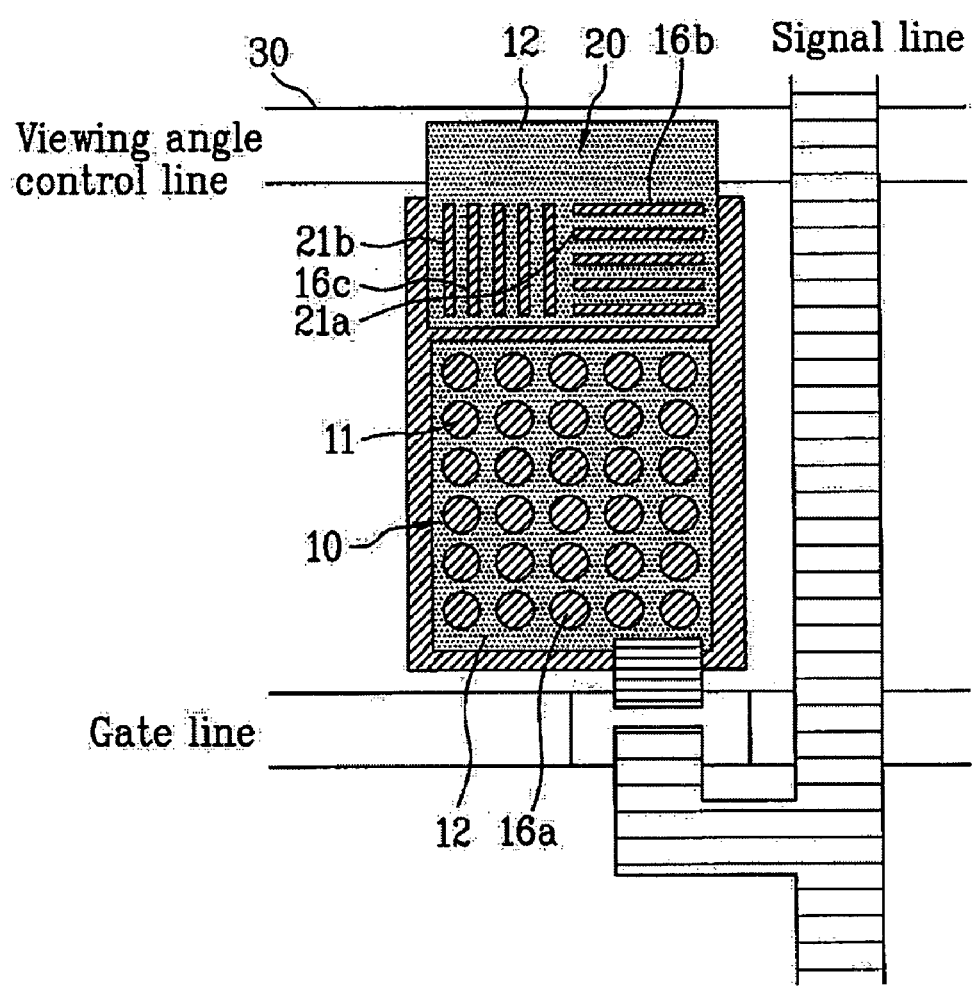
FIG. 8 is a plan view of a pixel in an FFS mode LCD device according to a second embodiment of the present invention.

FIG. 8 is a plan view of a pixel in an FFS mode LCD device according to the second embodiment of the present invention. In FIG. 8, each pixel is comprised of a display control region 10 and a viewing-angle control region 20.

The display control region 10 is controlled such that liquid crystal molecules of n-type liquid crystal are inclined. Also, a pixel electrode 12 including a first pixel hole 16a of a circle shape is formed in the display control region 10. That is, the pixel electrode 12 provided in the display control region has the circular-shaped first pixel hole 16. Also, a common electrode 11 is formed in a plate shape which is overlapped with the pixel electrode 12 of the display control region 10 and the pixel electrode 12 of the viewing-angle control region 20.

As the voltage is applied or not, the operation of the liquid crystal molecules in the display control region 10 will be explained in detail.

Figure 9A:
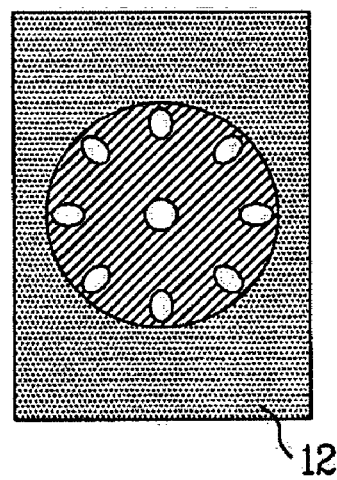
FIGS. 9A and 9B are schematic drawings illustrating the operation of liquid crystal molecules in a viewing-angle control region having a pixel electrode provided with a circular-shaped pixel hole in an FFS mode LCD device according to the second embodiment of the present invention.
Figure 9B:
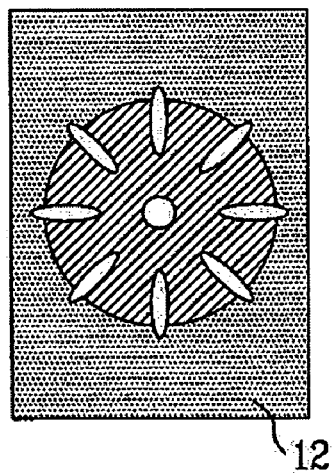

FIGS. 9A and 9B are schematic drawings illustrating the operation of liquid crystal molecules in the viewing-angle control region having the pixel electrode 12 provided with the circular-shaped pixel hole in the FFS mode LCD device according to the second embodiment of the present invention.

As shown in FIG. 9A, if the voltage is not applied to the device, the liquid crystal molecules erect vertically, whereby the pixel is displayed as the black. On the black screen, the display is recognized as the black from the front and side portions.

If the voltage is applied to the LCD device, as shown in FIG. 9B, the liquid crystal molecules are inclined in the predetermined direction decided by the pixel electrode 12 having the circular-shaped first pixel hole 16a, that is, the direction perpendicular to the outer circumference of the pixel electrode 12 including the circular-shaped pixel hole. As a result, the white display can be viewed from the front and side portions in the vertical (up and down) and horizontal (left and right) directions, that is, all directions of 360 degrees.

The viewing-angle control region 20 is controlled such that the liquid crystal molecules of n-type liquid crystal are inclined to the vertical and horizontal directions. Also, a control voltage is applied to the viewing-angle control region 20 through an additional viewing-angle control line 30 which is separated from the display control region 10.

The viewing-angle control region 20 includes a first area provided with the common electrode 21a of the horizontal direction, and a second area provided with the common electrode 21b of the vertical direction, wherein the first and second areas are formed together at both sides of the viewing-angle control region 20. At this time, the common electrode 21a of the horizontal direction is exposed by the second pixel hole 16b of the horizontal direction, and the common electrode 21b of the vertical direction is exposed by the third pixel hole 16c of the vertical direction. In this case, the second and third pixel holes 16b and 16c are formed in the line shape so as to pass through the pixel electrode 12 of the viewing-angle control region 20.

As shown in FIG. 8, if the liquid crystal is formed of n-type, the common electrodes 21a and 21b are formed in one pixel, as shown in FIG. 8, without performing a mask rubbing.

As a result, the liquid crystal molecules are inclined to all directions in the viewing-angle control region 20 by applying the control voltage through the viewing-angle control line 30, thereby controlling the viewing angle.

In the same mode as the first embodiment of the present invention, the voltage is applied to the viewing-angle control region 20 through an additional viewing-angle control line 30 which is separated from the display control region 10. The viewing-angle control line 30 is an independent common line for the viewing-angle control region 20, wherein the viewing-angle control line 30 is formed of a transparent electrode, to thereby improve an aperture ratio. Also, the common line is formed separately, so that it is possible to apply a voltage having a predetermined wavelength to the viewing-angle control region 20.

As the voltage is applied to or not, the operation of the liquid crystal molecules in the viewing-angle control region 20 having the common electrode 21a of the horizontal direction is the same as that of the liquid crystal molecules according to the first embodiment of the present invention, as shown in FIGS. 2A and 2B, which will be omitted.

The process of fabricating the viewing-angle control region 20 in the LCD device according to the second embodiment of the present invention is identical to the process of fabricating the viewing-angle control region in the LCD device according to the first embodiment of the present invention, whereby the detailed explanation will be omitted.

Figure 10:
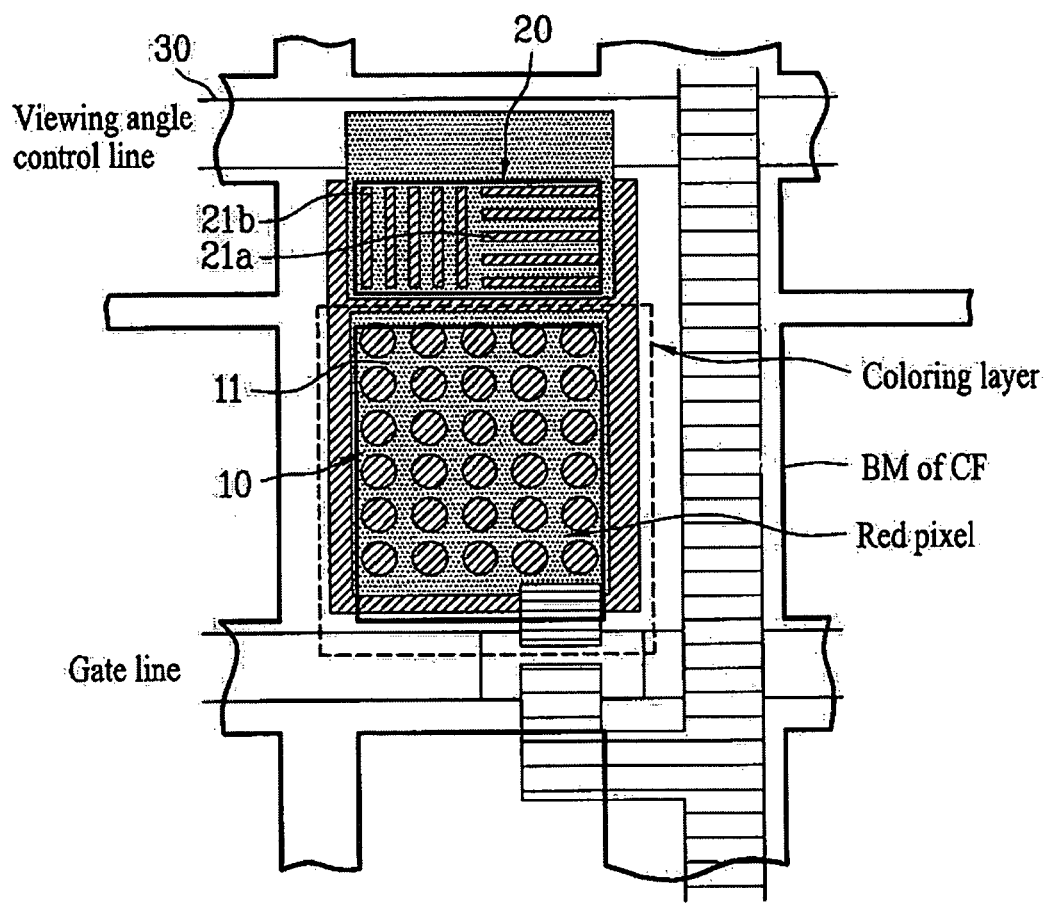
FIG. 10 is a plan view illustrating a pixel in an LCD device of the second embodiment manufactured by FIG. 3.
Figure 11:
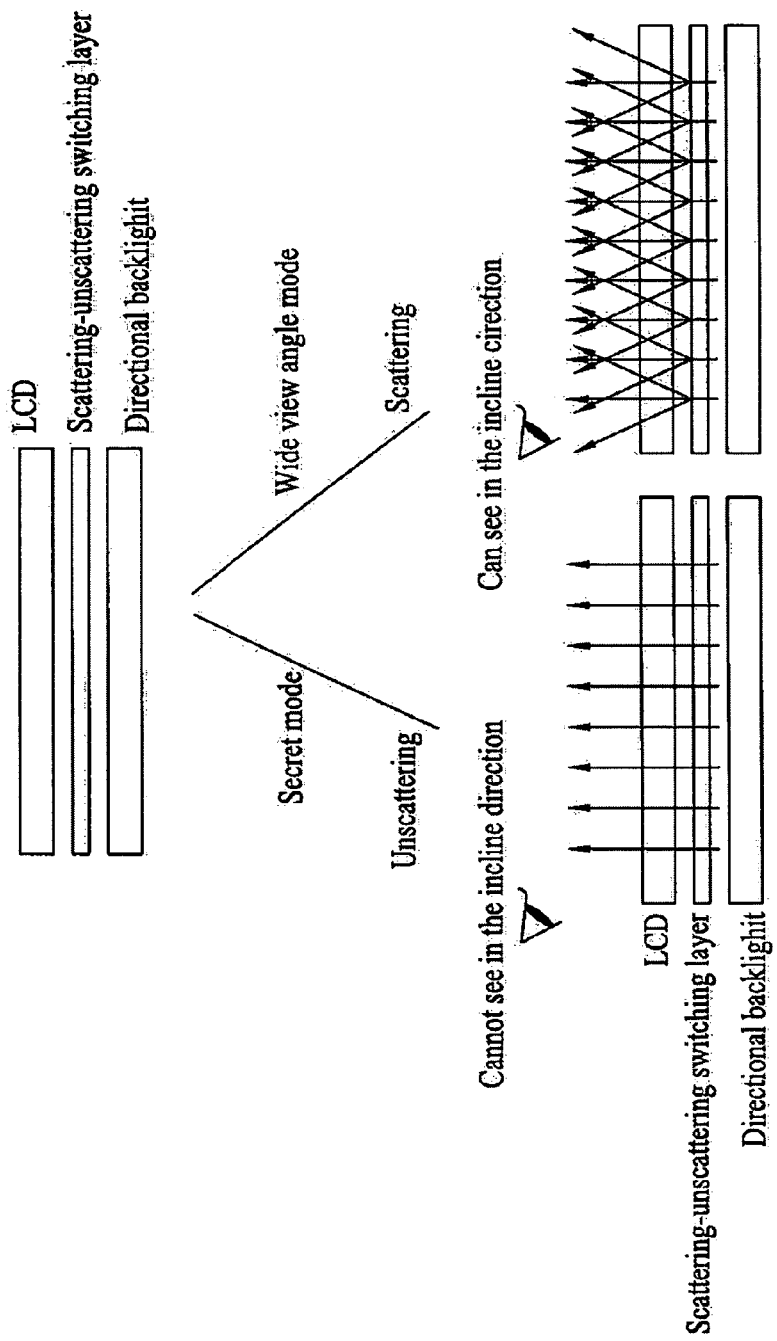
FIG. 11 is a schematic drawing illustrating a related art LCD device having a secret mode.
Figure 12A:
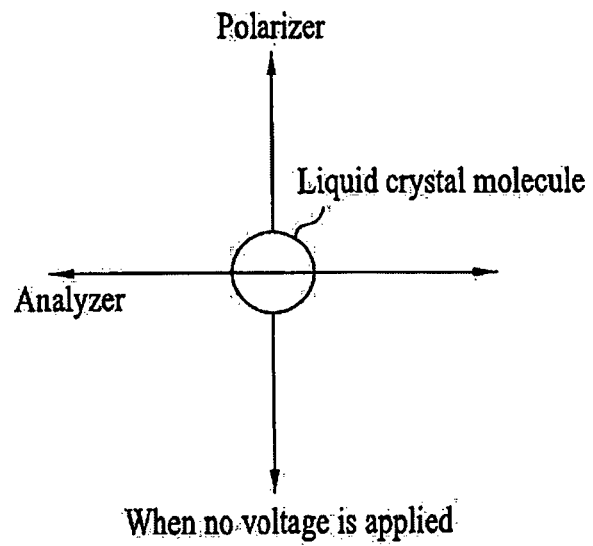
FIGS. 12A and 12B are schematic drawings illustrating the shape of related art liquid crystal molecules when viewing a vertical alignment type liquid crystal display from the front side.
Figure 12B:
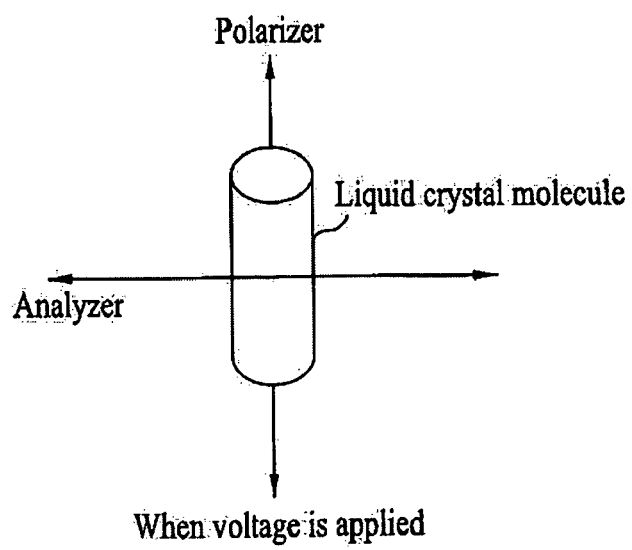
Figure 13A:
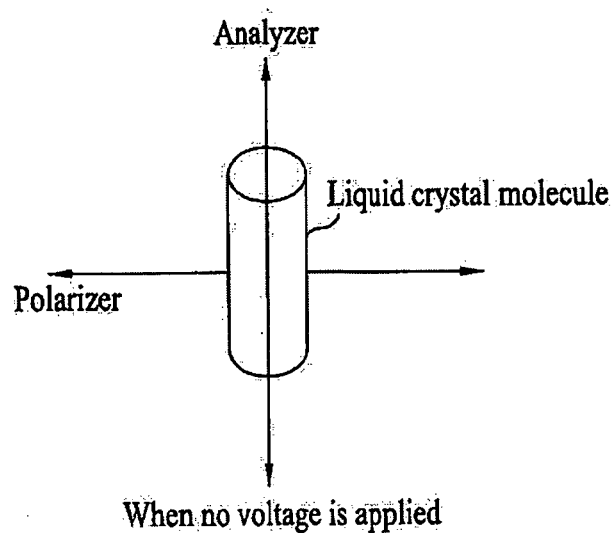
FIGS. 13A and 13B are schematic drawings illustrating the shape of related art liquid crystal molecules when viewing a vertical alignment type liquid crystal display from the side at an angle to the front of the liquid crystal display.
Figure 13B:
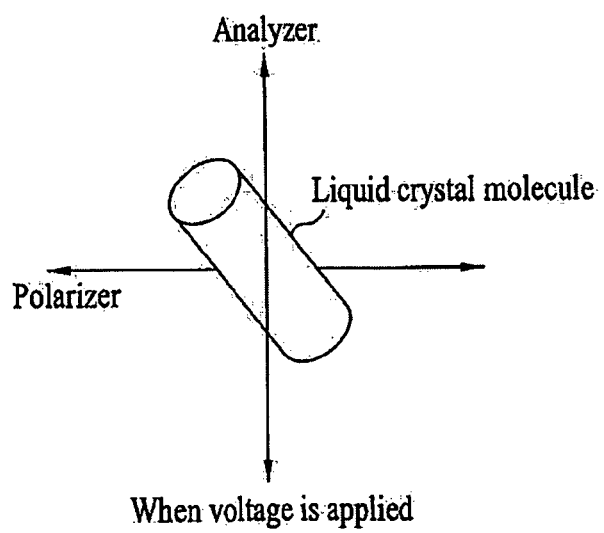
Figure 14:
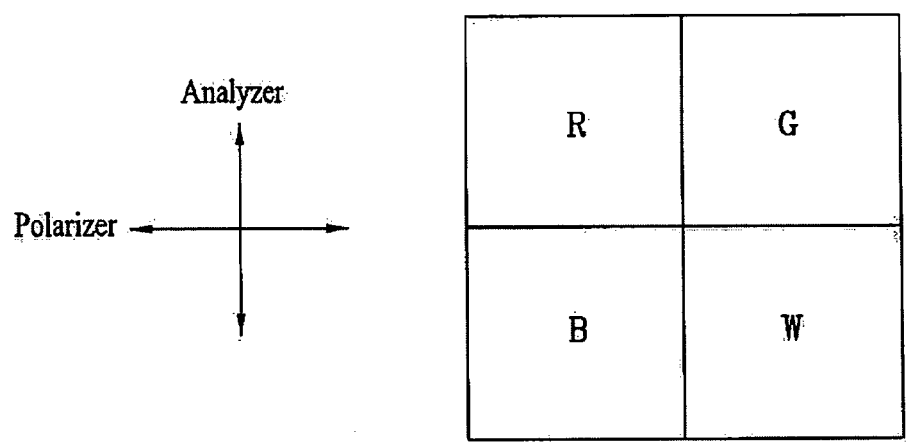
FIG. 14 is a schematic drawing illustrating a related art specific construction for controlling the confidentiality of the display.
Figure 15:
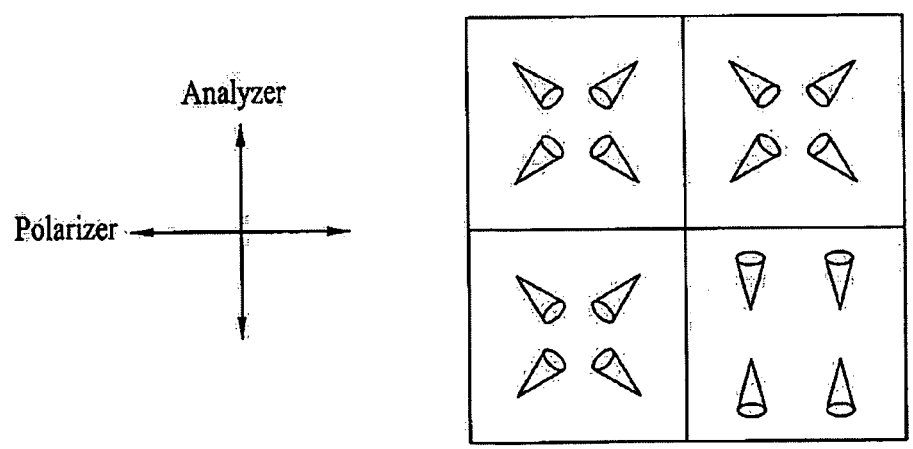
FIG. 15 is a plan view illustrating the arrangement of liquid crystal molecules of the respective sub-pixels shown in FIG. 14.
Figure 16:
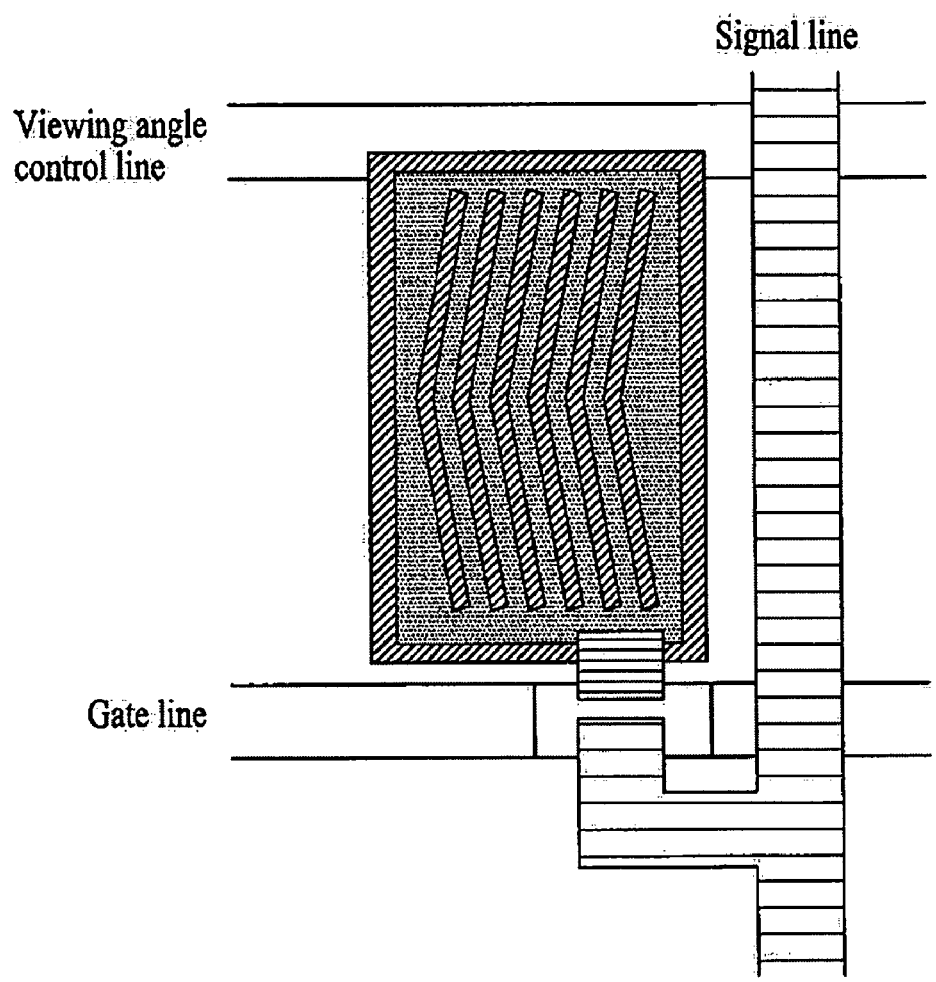
FIG. 16 is a plan view illustrating a pixel in a related art FFS mode LCD device.
Figure 17A:
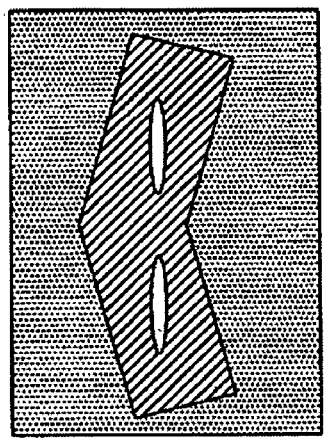
FIGS. 17A and 17B are schematic drawings illustrating the operation of liquid crystal molecule when a voltage is applied to a related art FFS mode LCD device.
Figure 17B:
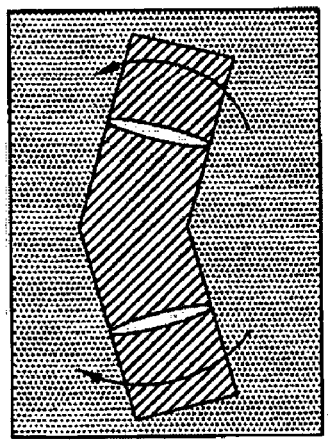

FIG. 10 is a plan view illustrating a pixel in an LCD device of the second embodiment manufactured by FIG. 3, which shows one example of R pixel.

By completing the process, the structure shown in FIG. 10 is formed.

By the above-mentioned 6-mask process, the independent viewing-angle control line 30 may be formed of the transparent electrode. Also, it is also possible to fill the viewing-angle control region 20 having the corresponding common electrode in the vertical or horizontal direction by applying the mask of the sixth process.

The luminance distribution of the viewing-angle dependency when the voltage is applied to the viewing-angle control region 20 according to the second embodiment of the present invention is identical to the luminance distribution of the viewing-angle dependency when the voltage is applied to the viewing-angle control region 20 according to the first embodiment of the present invention.

As the n-type liquid crystal is used in the second embodiment of the present invention, and the pixel electrode 12 including the circular-shape or elliptical-shape pixel hole 12 is formed in the display control region 10, it is possible to improve the visibility in all directions. In addition, it is possible to realize the confidentiality of display information in the vertical and horizontal directions by forming the viewing-angle control region according to the second embodiment of the present invention.

Also, when improving the visibility in all directions by forming the pixel electrode provided with the circular-shaped or elliptical-shaped pixel hole in state of the n-type liquid crystal is used, the transparent electrode is used of the viewing-angle control line without the effect of signal delay caused by the thickness of the acrylic layer, thereby improving the aperture ratio. Also, the LCD device according to the present invention can realize the control for the viewing angle in the horizontal (left and right) and vertical (up and down) directions.

Furthermore, the viewing-angle control regions of the horizontal and vertical directions are formed in the same pixel, whereby the LCD device according to the present invention can realize the confidentiality of information in the vertical (up and down) and horizontal (left and right) directions.

Also, it is unnecessary for the viewing-angle control region to provide the color filter, thereby decreasing the fabrication cost.

As mentioned above, the FFS mode LCD device according to the present invention and the method of fabricating the same has the following advantages.

In the FFS mode LCD device according to the present invention, one pixel includes the display control region and the viewing-angle control region, wherein the display control region is controlled such that the liquid crystal molecules are inclined; and the viewing-angle control region is controlled such that the liquid crystal molecules are inclined to the horizontal or vertical direction. In this case, the control voltage is applied to the viewing-angle control region through the viewing-angle control line which is separated from the common line for the display control region. Thus, it is unnecessary for the FFS mode LCD device of the present invention to form the white pixel. Even though the FFS mode LCD device according to the present invention has no white pixel, it is possible to perform the control for the viewing angle.

Furthermore, the viewing-angle control region of the horizontal direction and the viewing-angle control region of the vertical direction are properly provided together on the display screen, so that it is possible to realize the LCD device having the confidentiality of display information. Also, it is possible to decrease the fabrication cost without designing the color filter in the viewing-angle control region.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A FFS mode liquid crystal display device comprising:
    a display control region that is controlled such that liquid crystal molecules are inclined;
    a viewing-angle control region that is controlled such that liquid crystal molecules are aligned in a horizontal or vertical direction, wherein a control voltage is supplied through a viewing angle control line that is independent of a common line for the display control region;
    a common electrodes on the display control region and the viewing-angle control region, the common electrodes having a plate shape; and
    a pixel electrode for the display control region including first pixel holes having a chevron shape "<" and a pixel electrode for the viewing-angle control region including second pixel holes having a linear shape,
    wherein the pixel electrode for the display control region and the pixel electrode for the viewing-angle control region are independently applied voltage.

2. The device according to claim 1, wherein free of color layer is on a substrate opposite to the viewing-angle control region.

3. The device according to claim 1, wherein the liquid crystal molecules comprise n-type liquid crystal molecules.

4. The device according to claim 1, wherein the first pixel holes are arranged at a predetermined interval in a horizontal or vertical direction, and the second pixel holes are arranged at a predetermined interval in a direction different from that of the first pixel holes.

* * * * *

UNITED STATES PATENT AND TRADEMARK OFFICE
CERTIFICATE OF CORRECTION

PATENT NO. : 7,667,809 B2
APPLICATION NO. : 11/647535
DATED : February 23, 2010
INVENTOR(S) : Kazuyoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Seventh Day of December, 2010

David J. Kappos
*Director of the United States Patent and Trademark Office*